UNITED STATES PATENT OFFICE.

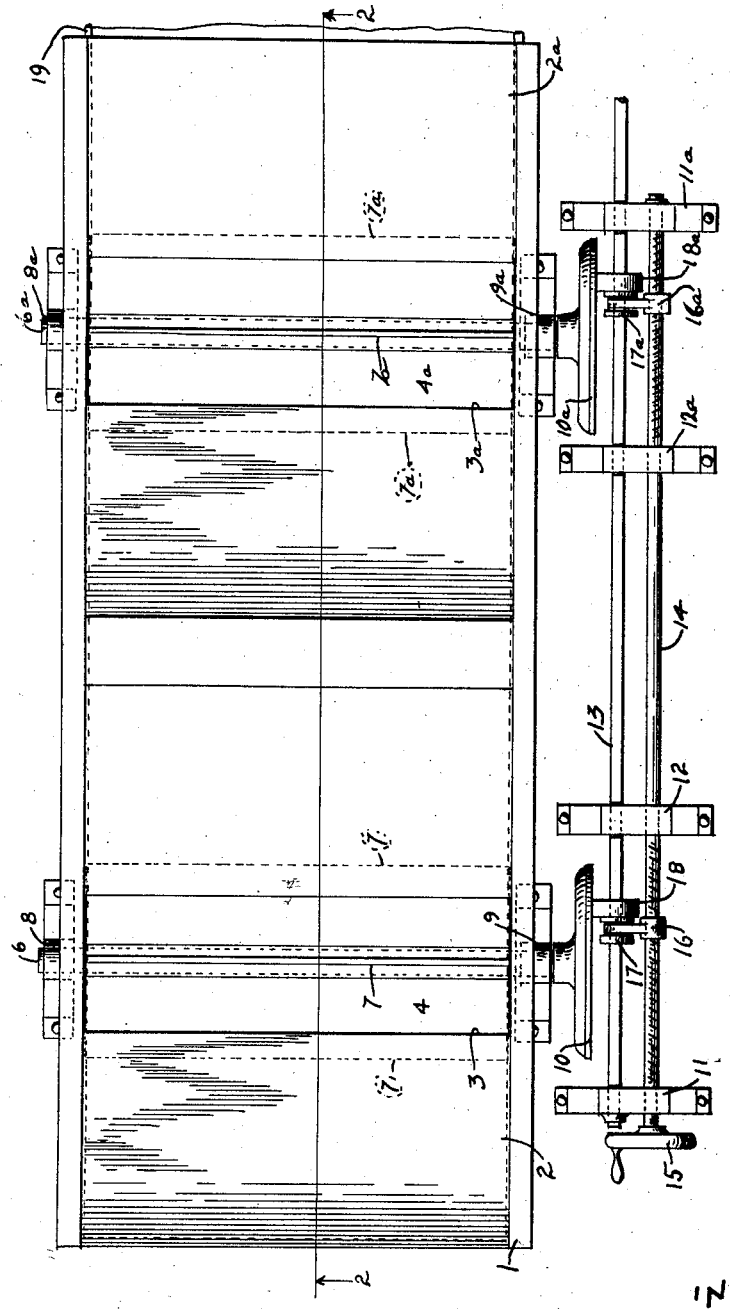

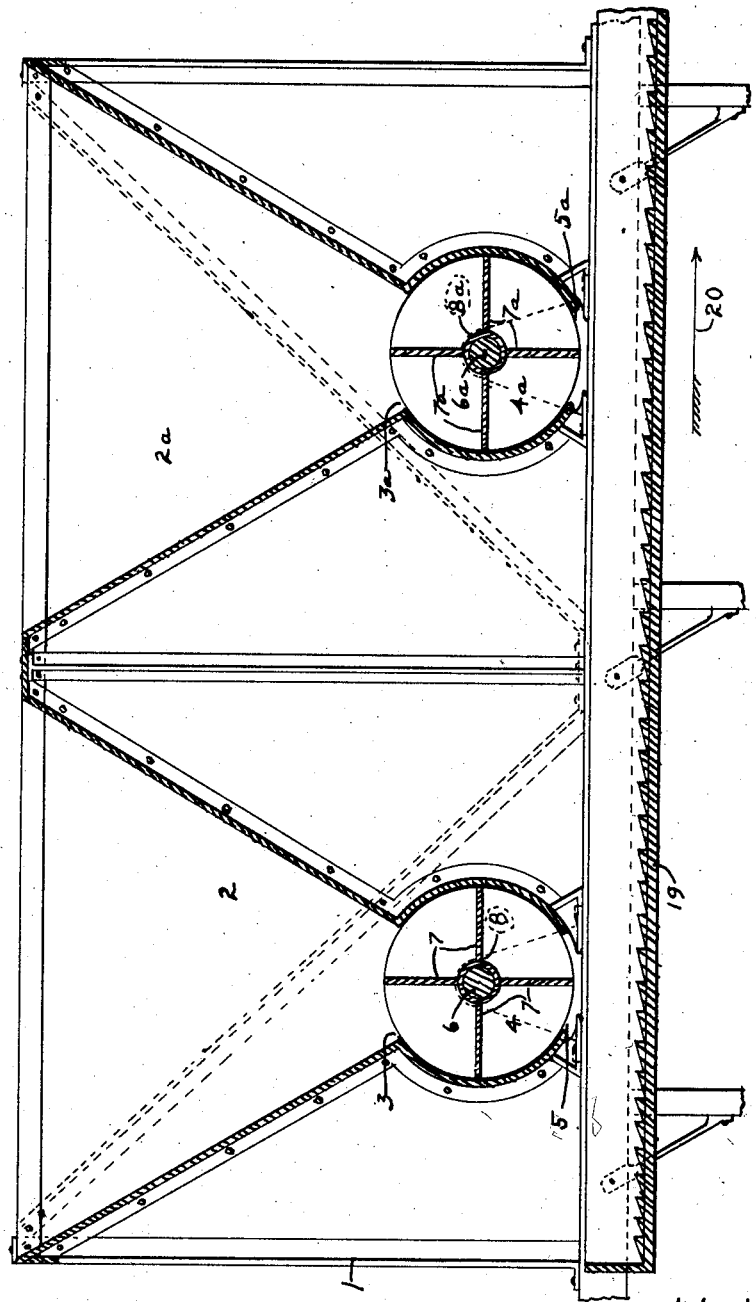

HARRY P. FLEMING, OF SANTA CLARA COUNTY, CALIFORNIA.

BLENDING-MACHINE.

1,349,505. Specification of Letters Patent. Patented Aug. 10, 1920.

Application filed September 2, 1919. Serial No. 321,292.

*To all whom it may concern:*

Be it known that I, HARRY P. FLEMING, a citizen of the United States, and resident of Santa Clara county, in the State of California, have invented certain new and useful Improvements in Blending-Machines, of which the following is a specification.

My invention relates particularly to a device for measuring and mixing predetermined quantities of dried prunes preparatory to packing the same or preparing the same for market.

In preparing the dried prunes for the market the dried fruit of different sizes has generally been mixed by hand in suitable proportions for the blend desired. This hand mixing produces far from uniform results, and therefore it is the object of my invention to provide a machine which will measure and mix proper quantities of each size of fruit required to secure the desired blend.

In the drawing:

Figure 1 is a plan view of the machine.

Fig. 2 is a sectional view on line 2—2 of Fig. 1.

Referring more particularly to the drawings, 1 indicates a frame of suitable material and proportions supporting a pair of hoppers 2—$2^a$. Since the construction of the two hoppers and the operating mechanism used in conjunction therewith is identical but one will be described in detail, the corresponding parts of the other being indicated by similar numerals followed by the letter "a."

Hopper 2 is provided with an oblong discharge orifice 3 at its lower portion communicating with a cylindrical chamber 4 built in frame 1 as shown and also having an oblong discharge orifice 5 in its lower side. Axially mounted in chamber 4 is revoluble shaft 6 carrying blades 7, the said blades being oblong and adapted to operate in close conjunction with the walls of chamber 4 when shaft 6 is rotated. Shaft 6 is mounted in bearings 8 and 9 and carries a friction disk 10 positioned at right angles to the axis of said shaft.

Mounted in parallel relation to the face of disk 10 and in bearings 11 and 12 are square driving shaft 13 and threaded shaft 14. Threaded shaft 14 is operated by means of a hand wheel 15 and carries a threaded fork member 16 adapted to engage a collar 17 on shaft 13 the said collar 17 being attached to friction wheel 18 which in turn engages friction disk 10. The revolving of square shaft 13 by power connections not shown drives friction disks 10—$10^a$ through the medium of friction wheels 18—$18^a$, the speed of rotation of disks 10—$10^a$ being determined by the position of wheels 18—$18^a$, this speed being regulated at will by adjusting wheels 18—$18^a$ through the medium of forked members 16—$16^a$ and collars 17—$17^a$. In the present case shaft 14 is shown with reversely threaded portions with wheels 18—$18^a$ so positioned that the operation of shaft 14 will simultaneously move the two wheels in opposite directions with relation to the axes of disks 10—$10^a$ thereby simultaneously reducing the speed of one disk and accelerating the speed of the other. Since hoppers 2—$2^a$ and the measuring devices in chambers 4—$4^a$ have the same capacity it is clear that the proportions of fruit delivered by the two devices are determined by the relative speeds of the same and that these relative speeds may be adjusted at will by the operator without altering the gross amount of fruit run through the machine.

Beneath hoppers 2—$2^a$ is operatively mounted a shaker-carrier 19, mounted and operated in the manner well known in the art to which this invention pertains and in the present instance moving the fruit deposited thereon in the direction indicated by the arrow 20.

In operation the fruit deposited on shaker 19 by measuring device in chamber 4 is spread out and moved forward by the agitation of said shaker. The fruit from the device in chamber $2^a$ is deposited upon this moving layer of fruit from the first device and is also spread out and moved forward by the agitation of said shaker so that a thorough blending of fixed proportions of fruit is secured, the proportions being varied when desired by the operation of hand wheel 15 without carrying the gross amount of fruit passing over shaker 19.

While I have herein shown and described one specific embodiment of my invention it is understood that changes in form, proportions, construction and method of operation may be made within the scope of the appended claims as, for instance, other forms of carriers than the shaker shown may be used without departing from the spirit of my invention.

I claim:

1. A blending machine comprising a pair of hoppers mounted to receive and discharge material therefrom, revoluble measuring devices operatively mounted to receive from said hoppers, a friction disk operatively mounted to rotate each of said devices, adjustable friction wheels operatively mounted to simultaneously rotate said disks, and means for simultaneously adjusting said friction wheels with relation to the axes of their respective disks whereby the same may be caused to rotate at different speeds.

2. A blending machine comprising a pair of hoppers mounted to receive and discharge material therefrom, a cylindrical chamber positioned to communicate with each hopper and having a discharge opening, a shaft revolubly mounted in each chamber in parallel relation to the discharge opening thereof, a plurality of blades mounted on each shaft to form pockets in said chambers, a friction disk mounted on one end of each shaft, a drive shaft mounted in parallel relation to said disks, a pair of friction wheels adjustably mounted on said drive shaft to engage said disks, and manually operated means for simultaneously adjusting said friction wheels with relation to the axes of their respective disks whereby the same may be caused to rotate at different speeds.

HARRY P. FLEMING.